US008753556B2

(12) United States Patent
Kloepfer

(10) Patent No.: US 8,753,556 B2
(45) Date of Patent: Jun. 17, 2014

(54) METHOD FOR MINING SIMULATIONS

(71) Applicant: Carolina Biological Supply Company, Burlington, NC (US)

(72) Inventor: Brian Matthew Kloepfer, Jamestown, NC (US)

(73) Assignee: Carolina Biological Supply Company, Burlington, NC (US)

( * ) Notice: Subject to any disclaimer, the term of this patent is extended or adjusted under 35 U.S.C. 154(b) by 0 days.

(21) Appl. No.: 14/010,800

(22) Filed: Aug. 27, 2013

(65) Prior Publication Data
US 2014/0015165 A1 Jan. 16, 2014

Related U.S. Application Data

(62) Division of application No. 13/078,493, filed on Apr. 1, 2011, now Pat. No. 8,556,612.

(60) Provisional application No. 61/320,206, filed on Apr. 1, 2010.

(51) Int. Cl.
*B29C 39/10* (2006.01)

(52) U.S. Cl.
USPC ........................................ 264/275; 264/279.1

(58) Field of Classification Search
None
See application file for complete search history.

(56) References Cited

U.S. PATENT DOCUMENTS

| 1,351,392 | A | * | 8/1920 | Manheimer | 434/152 |
| 2,185,924 | A | * | 1/1940 | Perei | 264/257 |
| 2,382,784 | A | * | 8/1945 | Emery | 264/250 |
| 2,684,503 | A | * | 7/1954 | Silver | 264/254 |
| 3,137,080 | A | * | 6/1964 | Zang | 434/152 |
| 3,742,620 | A | * | 7/1973 | Knoll | 434/152 |
| 3,751,827 | A | * | 8/1973 | Gaskin | 434/152 |
| 2006/0257829 | A1 | * | 11/2006 | Mason | 434/152 |

OTHER PUBLICATIONS

Women in Mining Education Foundation, Activities Database: Cookie Mining . . . Rebaked, http://www.womeninmining.org/activities/Cookie$_{13}$ Mining$_{13}$ Rebaked.pdf (accessed Jun. 30, 2010).
Fred Hatch and Greg Helms, Mining in Maryland, Maryland Department of the Environment, http://www.mde.state.md.us/programs/Land/mining/Outreach%20and%20Education/Pages/Program.
Women in Mining Education Foundation, Activities Database: Mining in a Nutshell, http://www.womeninmining.org/activities/Mining$_{13}$ in$_{13}$ a$_{13}$ Nutshell$_{13}$ Advanced.pdf (accessed Jun. 30, 2010).

* cited by examiner

*Primary Examiner* — Edmund H. Lee
(74) *Attorney, Agent, or Firm* — Olive & Olive, P.A.

(57) ABSTRACT

The present invention relates to an educational method and apparatus for the instruction of basic scientific principles relating to mining. The apparatus consists of a kit for science instruction that comprises a topographic mold, casting compound, and one or more components simulating materials found in nature beneath the surface of the earth. The kit may include a tool for obtaining core samples of the resulting topographic model and may include a topographic map. The components of the kit may be used in conjunction with weight measurement tools.

1 Claim, 5 Drawing Sheets

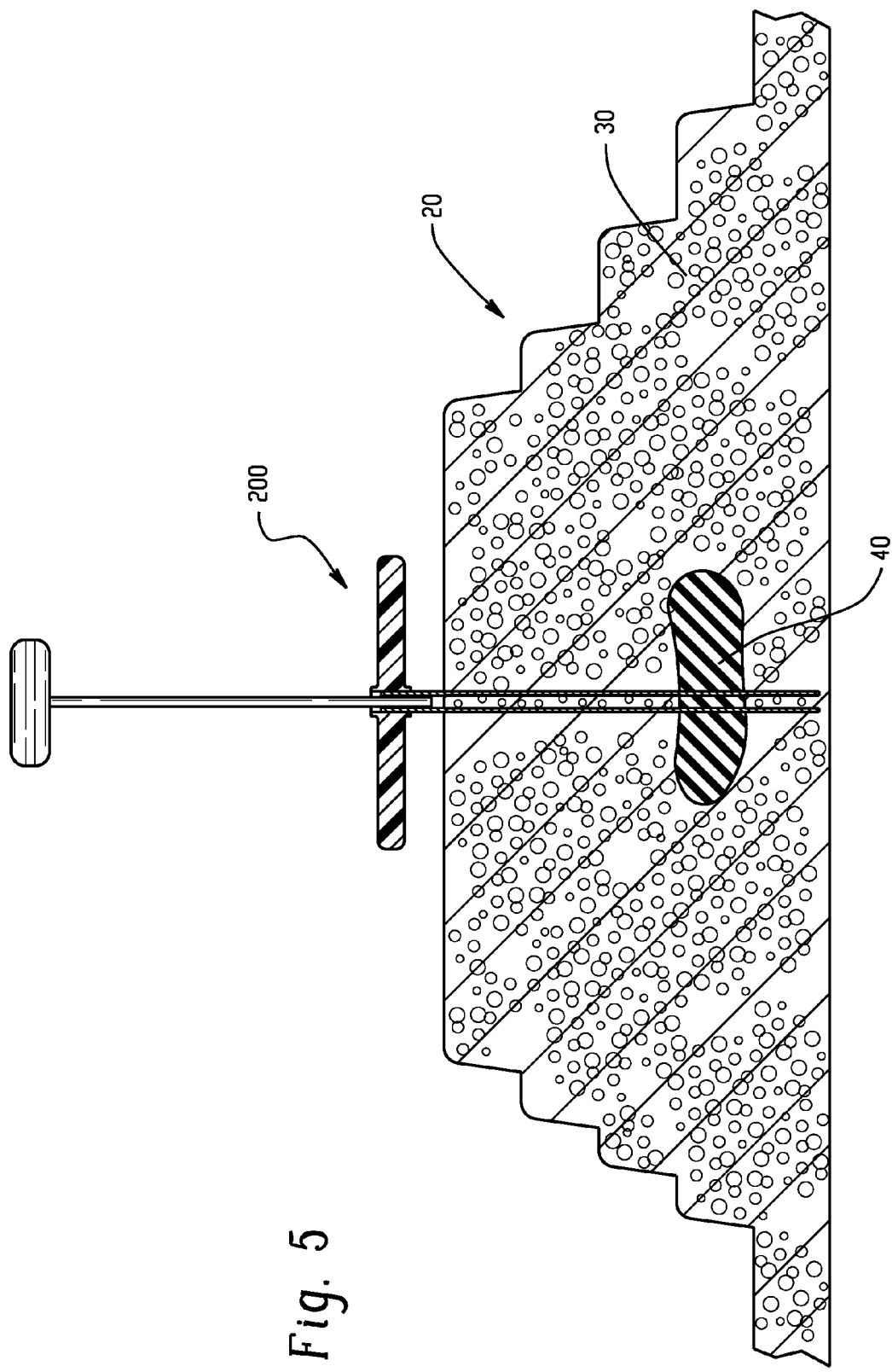

METHOD FOR MINING SIMULATIONS

CROSS-REFERENCE TO RELATED APPLICATIONS

This application is a divisional application of application Ser. No. 13/078,493 and claims priority to application Ser. No. 13/078,493 filed Apr. 1, 2011, now U.S. Pat. No. 8,556,612, and the priority of Provisional Patent Application Ser. No. 61/320,206, filed on Apr. 1, 2010 the disclosures of which, including the drawings, are incorporated herein by reference

STATEMENT REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION

The present invention relates to a new and improved method and apparatus that can be used in various embodiments for teaching scientific principles, costs, and environmental impacts of mining. In one form, the invention provides a topographic model comprising at least one component that simulates a material found below the earth's surface.

BACKGROUND OF THE INVENTION

Presently, there exist kits that allow users to excavate rocks, crystals, gold, or other items from plaster blocks. Such kits provide users with a small-scale archeological experience but typically focus on entertainment without affording significant opportunities for instruction, particularly as relates to the scientific principles, costs, or environmental impacts of real mining operations. To the extent instruction is provided, such instruction typically relates to archaeological methods—for example, the use of brushes or other tools when excavating delicate objects. The blocks used for such instruction generally have no topographic features and do not provide an opportunity to draw conclusions about the scientific principles, costs, or environmental impacts of mining. Teachers currently attempt to provide elements of topography for student mining utilizing layers of sand and similar loose materials, but such models are inherently messy and inconsistent. There remains a need for an improved apparatus that can provide an enjoyable student experience while facilitating learning.

More specifically, there is a need for a topographic model for mining simulations. Topographic models provide a three-dimensional representation of features, including surface features, of a region, which may be an imaginary or actual place located on the planet Earth or elsewhere. A topographic model that can be excavated offers users both visual and hands-on experience and can provide learning opportunities that take advantage of different learning styles.

It is a purpose of this invention to provide a model kit and construction methodology for creating a topographic model that has educational value and interest. A further purpose of the present invention is to provide a model apparatus and construction methodology to allow the user to create a simulation of a real mining operation. Still a further purpose of the present invention is to provide a model from which users may understand one or more of the scientific principles, costs, or environmental impacts of mining. Additional purposes will become evident to those skilled in the art from the specification and claims; and it should of course be understood that not all embodiments of the invention will necessarily meet each purpose described herein or understood from such perusal of the specification and claims.

BRIEF SUMMARY OF THE INVENTION

It should be understood that this Summary is provided merely to introduce certain concepts and not to identify any key or essential features of the claimed subject matter.

In one embodiment of the invention, a model kit comprises components for the creation and excavation of a topographic model containing one or more simulated deposits. The simulated deposits may represent materials that ordinarily are found below the earth's surface—for example, one or more minerals. The kit of this embodiment may further comprise a mold from which a topographic model may be constructed, and may comprise one or more casting materials to represent the remaining components of the topography under investigation (soil, rocks, etc.), generally referred to as the "earth." The kit may also include pigment to allow the casting material(s) to be colored or otherwise decorated. In this and other embodiments of the invention, the kit may include a tool—for example, a borer—suitable for taking core samples from a topographic model. This and other embodiments of the kit may further include a topographic map or materials for creating a topographic map based upon the contours of the topographic mold. Such a map may have utility, for example, to assist users in placing the simulated deposits during molding. Such a map may also or alternatively have utility to assist users in working with the topographic mold after its creation, for example to locate and map the simulated deposits and/or to decide where to take core samples or to excavate material from the topographic mold.

In another embodiment of the invention, a topographic mold is filled with casting material. One or more simulated deposits is placed into the mold before, during, and/or after the step of filling the mold with casting material. The casting material is allowed to cure, and the resultant topographic model then is removed from the mold. Pigment may be added at any point in the model construction process to color or decorate all or part of the model.

In an embodiment of the invention, samples may be taken from a topographic model comprising casting material and simulated deposits, using an appropriate sampling tool, for example a borer. The simulated deposits may be excavated from known locations as determined by such sampling and/or in a more random fashion. The simulated deposits and casting material may then be weighed to determine how much of each was removed during excavation.

In an embodiment of the invention, a topographic model comprising casting material and simulated deposits may be used to teach the potential costs and environmental impacts of excavating deposits from a region. For example, costs may be assigned for each unit of material that is not the simulated deposit material, and assessed when such non-target material is removed from the mold. As another example, costs may be assigned for each unit of surface that is disturbed during excavation of the mold. As another example, costs may be differentially assigned dependent on topological features that are disturbed or destroyed during excavation. A user may utilize one or more selected techniques to perform one or more excavations, and analyze the artificial costs and environmental impacts of the excavation(s).

These and other embodiments of the invention are set out hereafter and persons skilled in the art will readily appreciate yet further methods of carrying out the invention. The scope of the claims is not to be limited by such descriptions as the invention is capable of other embodiments and of being practiced and being carried out in various ways.

BRIEF DESCRIPTION OF THE DRAWINGS

In order that the invention may be more clearly understood, an embodiment thereof will now be described in detail by way of example, with reference to the accompanying drawings, in which:

FIG. 5 is a cutaway view illustrating an exemplary topographic model containing a simulated mineral deposit with an exemplary tool being used to obtain a sample from a portion of the model.

As with descriptions in words, the drawings are illustrative of various embodiments of the invention and not limiting. The invention is capable of other embodiments and of being practiced and being carried out in various ways.

DETAILED DESCRIPTION

A more complete understanding of an embodiment of the invention may be obtained by reference to the accompanying drawings, which depict a kit of components for the creation of a topographic model and use of the model for subsequent sampling and excavation.

The exemplary kit as reflected in the accompanying drawings is comprised of a topographic mold, casting material, and simulation material to simulate minerals.

Figure 1:
FIG. 1 depicts an exemplary topographic mold.
Figure 4:
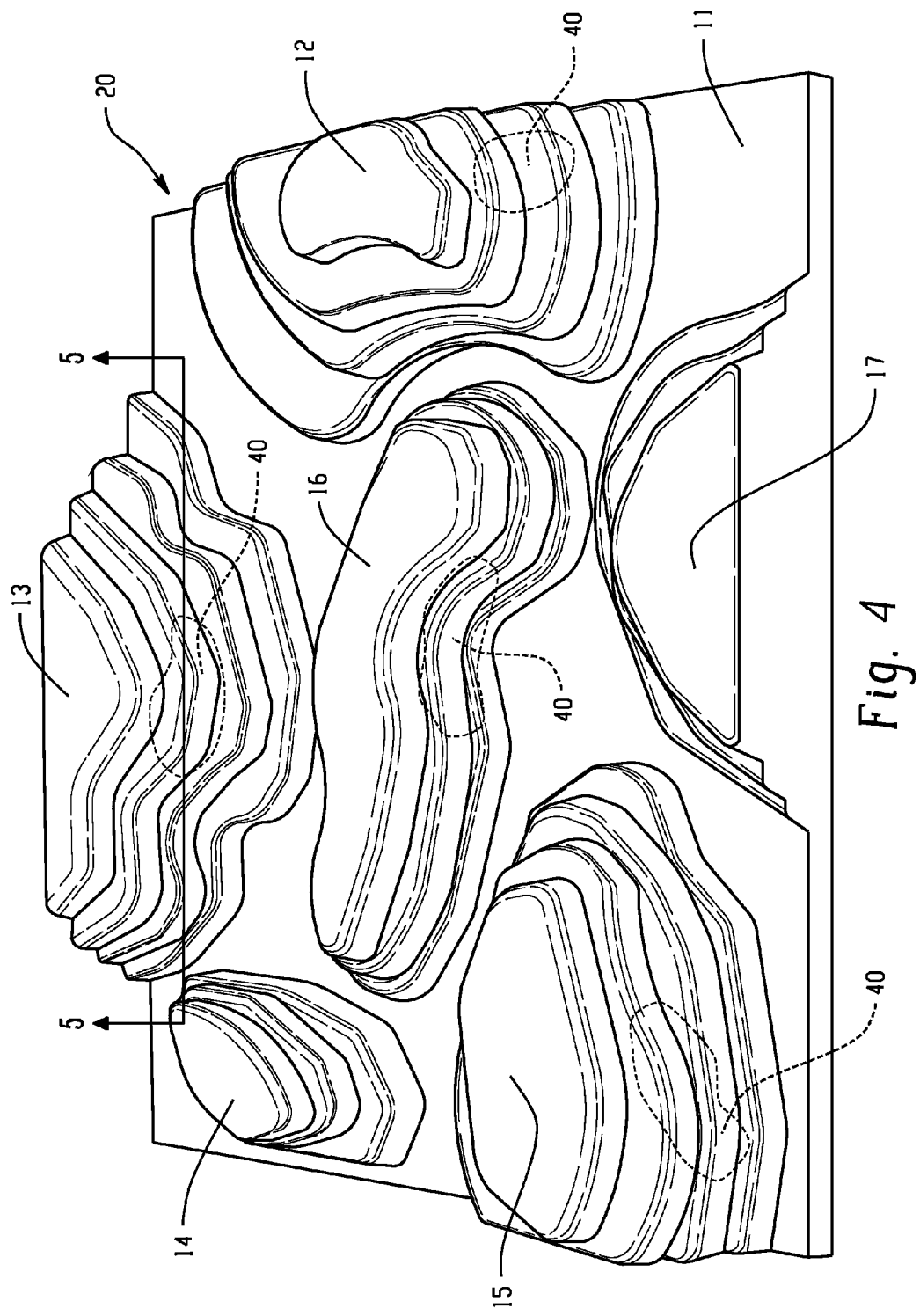
FIG. 4 depicts an exemplary topographic model containing several simulated mineral deposits.

FIG. 1 depicts an exemplary embodiment of a topographic mold 10. The topographic mold 10 may be comprised of injection molded plastic, metal, silicone, or any other material suitable for creating a topographic model. The exemplary mold 10 depicted in FIG. 1 is constructed so that a model formed therein will have one or more peaks and valleys. Accordingly, when viewed from the perspective as shown in FIG. 1, exemplary mold 10 has a base 11 with one or more peaks 12, 13, 14, 15, 16, 17, rising above the base 11. In an exemplary embodiment, the base 11 is connected to a support area 18 for ease of use when moving the mold 10 or removing a completed topographic model from the mold 10. As shown in FIG. 1, peaks 12, 13, 14, 15, 16, 17 are formed in steps rather than imitating the more typical steady slope of a mountainside or lakebed. This stepwise formation, not required, conforms to the manner in which topological maps typically display gradients of the height or depth of land above and below sea level. For simplicity of understanding and illustration, mold 10 is shown with all topologic features extending in a single direction so as to create a topologic model 20 containing various mountains or portions thereof, as illustrated in FIG. 4. However, it will be readily understood by those skilled in the art that formations extending into any direction can be created in such molds and that imitations even of complex combinations of geologic formations can be created.

Optionally, the kit may include one or more of a tool 200 suitable for obtaining core samples from the resulting topographic model (see FIG. 5); a topographic map 100 (FIG. 2) based upon the topology of mold 10; pigments, for example crayons, suitable for adding color to one or more of the casting material, the simulation material, or the surface of topographic model 20 (see FIG. 4); and/or an instruction manual. It should be noted that topographic map 100 is depicted as a simple map, having contour lines to represent relief and showing little detail. Persons skilled in the art will appreciate that the topographic maps can be drawn in various styles and it is not necessary that any particular style of topographic map be utilized. An exemplary instruction manual may contain instructions for creating, sampling, and/or excavating the topographic model 20. The instruction manual may contain rules for using the model 20 and analyzing the information obtained, for example guidelines for simulating costs of research, exploration, operation, and refinement and environmental impacts relating to the simulated deposits 40 (see FIGS. 2-5).

Figure 2:
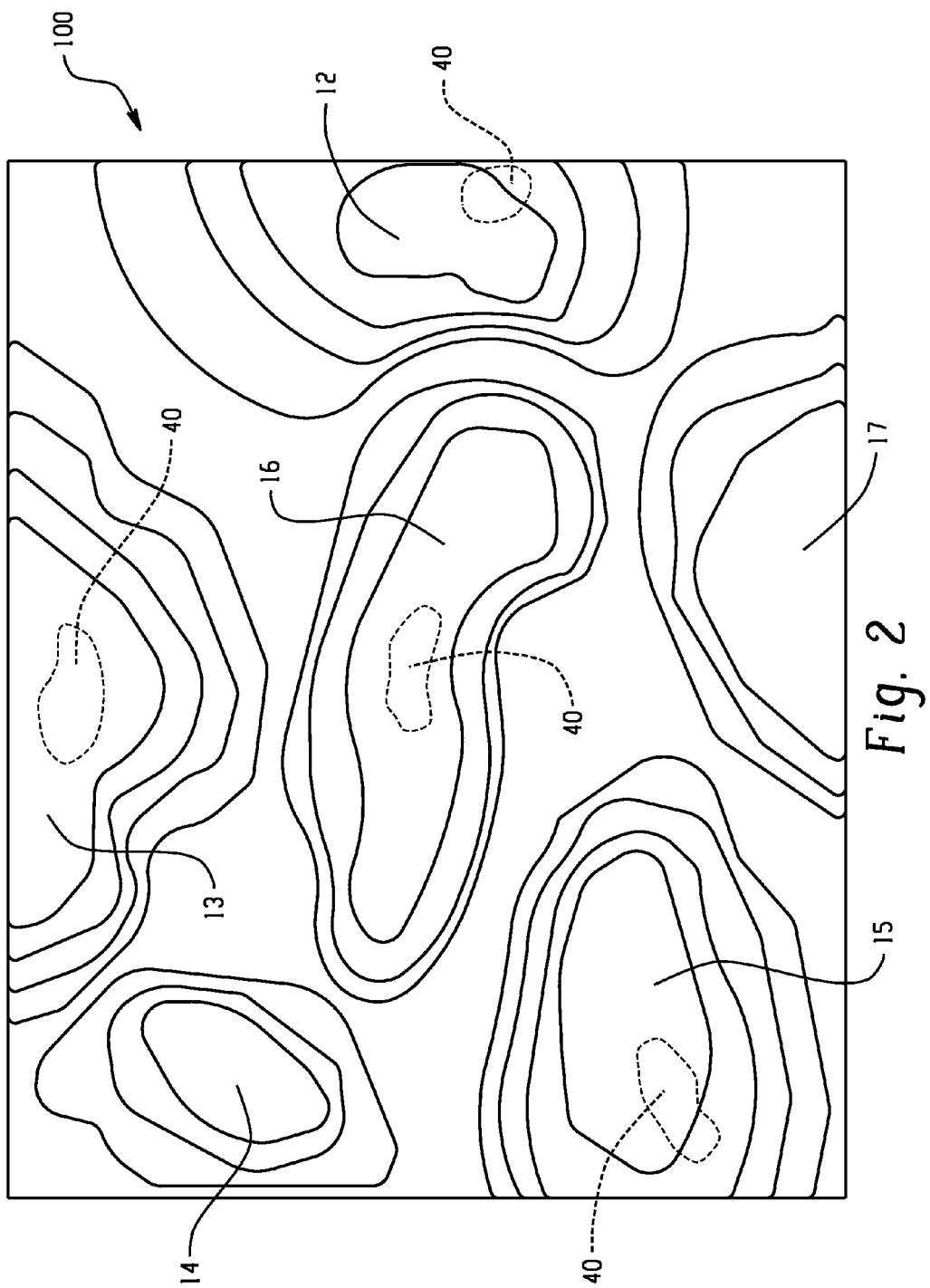
FIG. 2 illustrates a contour map depicting an exemplary placement of simulated mineral deposits within an exemplary topographic mold.

FIG. 2 illustrates a topographic map 100 that corresponds with the exemplary topographic mold 10 shown in FIG. 1. Exemplary map 100 is labeled to indicate where one or more simulated deposits 40 should be placed within the mold 10. In the alternative or in addition, a kit may contain one or more blank topologic maps 100. When a kit contains only blank topologic maps 100, a kit user may choose where one or more simulated deposits 40 are to be placed, and a kit user may use one or more of the blank topologic maps 100 to create a reference map by marking thereon the location where simulated deposits 40 have been placed.

An exemplary method of using the heretofore described embodiment of the inventive kit now will be described referencing FIGS. 1-5.

A kit user, who may, for example, be a teacher, prepares a casting material 30. The material 30 may be comprised of wax, plaster, foaming plastic, soap base, or any other material suitable for creating the model 20 and having, when unmolded and ready to use as described hereinafter, a consistency and texture that permits obtaining core samples or alternatively or additionally permits excavation. The kit user orients the mold 10 such that it is in a position for filling with casting compound and/or other material. The user determines, or is told (orally or for example, by illustrations such as those depicted on topologic map 100) which of the peaks 12, 13, 14, 15, 16, 17 will contain simulated deposits 40. The user also determines, or is told, how deeply to embed the simulated deposits 40 within each of the peaks 12-17.

Figure 3:
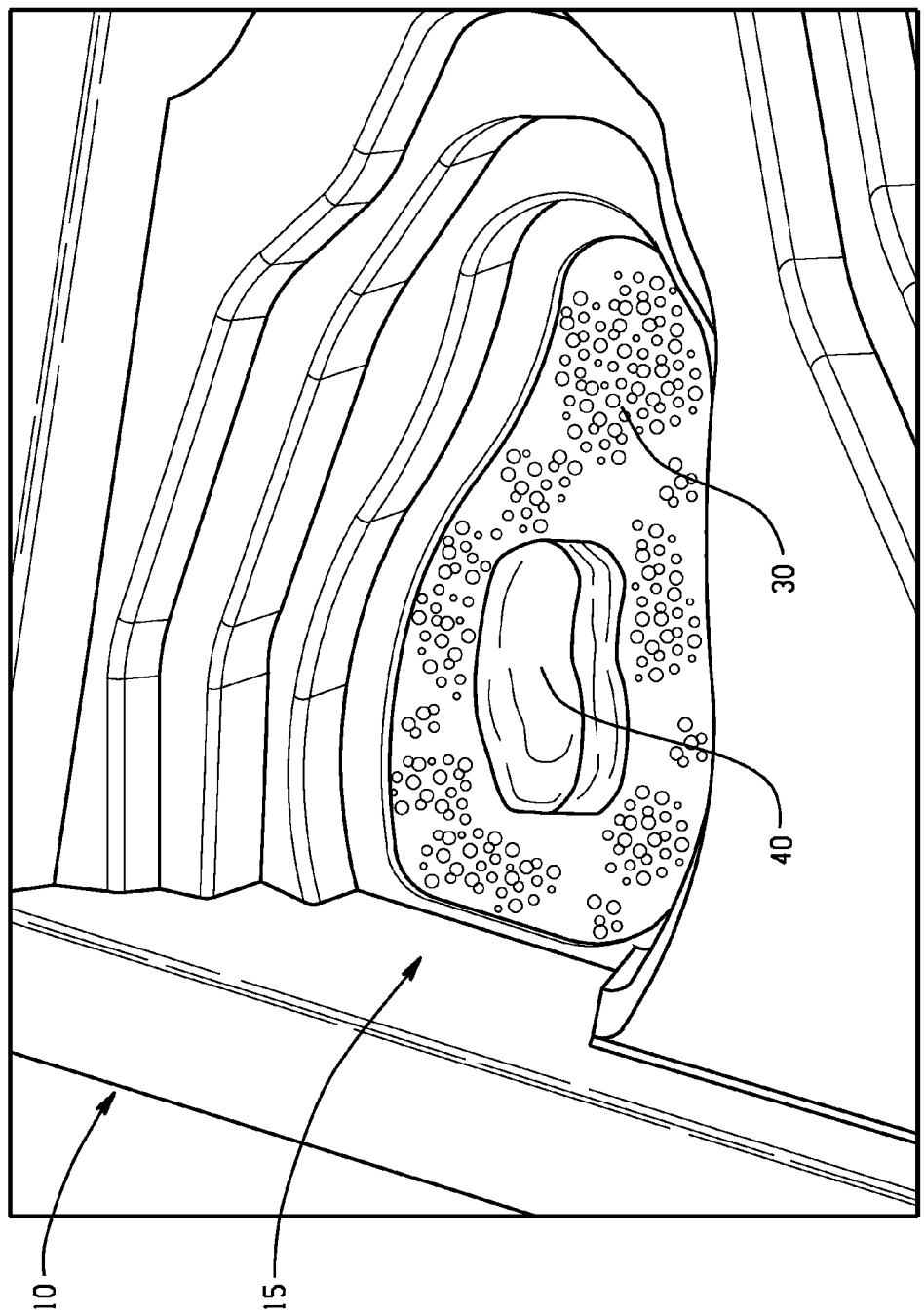
FIG. 3 depicts the underside of a portion of an exemplary topographic mold wherein the cavity formed from a raised geographic structure is partially filled with casting material as well as an exemplary simulated mineral deposit.

In one embodiment, where a user desires to embed the deposit material somewhat centrally within the peaks, the user will partially fill the peaks 12, 13, 15, 16 with casting material 30 such that the resulting model 20, as shown in FIG. 4, will correspond with the map 100 as shown in FIG. 2. FIG. 3 depicts an exemplary peak 15 partially filled with casting material 30. The peak 15 should be filled with more or less casting material 30 depending on whether the user desires the simulated deposit 40 to be more or less deeply buried within the selected peak 15.

When the casting material 30 is sufficiently solid, the user should then place a simulated deposit 40 within, for example, the selected peak 15 as shown in FIG. 3. In an embodiment, the simulated deposit 40 is formed from modeling clay or another material suitable for obtaining core samples. The deposit 40 may also be a distinctly different color from the casting compound to allow for easy identification.

Upon placing the simulated deposits 40 into the peaks 12, 13, 15, 16 in the exemplary embodiment, the kit user then fills the mold with the casting material 30 such that the casting material 30 both takes the form of the mold and surrounds and encases the simulated deposits 40. The kit user will continue filling the mold 10 with the casting material 30 until the mold 10 is completely full. The topographic model 20, comprised of the casting material 30 and the simulated deposits 40, is allowed to cure within the mold. The model 20 is then removed from the mold as depicted in FIG. 4.

Thereafter, a user, who may be a second user such as a student, utilizes a tool 200 to obtain core samples of the topographic model 20 as shown in FIG. 5. The tool 200 for obtaining core samples from the topographic model may be a borer but alternatively could be any device capable of capturing and removing such samples. A device in the nature of a pipe cleaner or miniature trowel, for example, might be used.

Having obtained core samples, the second user may then evaluate the potential costs, profits, and environmental impacts of excavating the simulated deposits 40 as provided, by the instructions and based on the portion of the simulated deposits 40 obtained from the core samples. The second user may then utilize one or more techniques to excavate the simulated deposits 40. The simulated deposits 40 and casting material 30 may then be weighed to determine how much of each was removed from the excavation. Finally, the second user may calculate the costs, profits, and impacts of the performed excavation based on guidelines provided in the instructions.

As set forth herein, the model kit of the present invention provides an increased level of realism and educational interest over conventional mining kits. Those skilled in the art will recognize that modification and adaptions to the invention are possible without departing from the intended scope of the invention. The steps described herein need not be performed in the order described, and steps may be added or omitted.

What is claimed is:

1. A method of constructing a topographic model from which one or more core samples can be removed, comprising the steps of
    assembling one or more simulation components to simulate material found in nature beneath the surface of the earth in a topographic mold having one or more mold cavities, said simulation components having a consistency and texture that permits obtaining core samples;
    casting a topographic model by loading a casting compound into the mold, encasing and embedding the simulation components within the casting compound, said casting compound being formed of material that, once cured, will permit the removal of core samples from the cast without significantly affecting the texture and composition of other portions of the cast; and
    allowing the casting compound to cure and removing the cast topographic model from the topographic mold.

* * * * *